Sept. 29, 1959     H. S. MOUNT     2,906,280
BREAK-AWAY COUPLING
Filed Dec. 12, 1955     2 Sheets-Sheet 1

INVENTOR.
HUBERT S. MOUNT
BY
ATTORNEY

Sept. 29, 1959     H. S. MOUNT     2,906,280
BREAK-AWAY COUPLING

Filed Dec. 12, 1955     2 Sheets-Sheet 2

INVENTOR.
HUBERT S. MOUNT
BY
ATTORNEY

United States Patent Office

2,906,280
Patented Sept. 29, 1959

2,906,280

BREAK-AWAY COUPLING

Hubert S. Mount, Collingswood, N.J., assignor to Sun Oil Company, Philadelphia, Pa., a corporation of New Jersey Application December 12, 1955, Serial No. 552,563

3 Claims. (Cl. 137—68)

This invention relates to automatic break-away couplings such as are used in hose lines carrying inflammable fluids and subject to unintentional strain, and more particularly to the elements forming the operating portion of such couplings.

Solutions to the problem of separable or break-away couplings which function automatically under conditions of strain on the conduit in which they are placed are numerous. In some instances they include valve members caused to close by fluid pressure or operation of remotely connected lever arms positioned adjacent the point of separation. Usually this separation area is predetermined by installing a quick-release means in the nature of a spring-latched combination. Such a slip-release joint is used in conjunction with remote hydraulic responsive valves as well.

These methods and apparatus for meeting the problem of conveying volatile, inflammable fluids in hoses, such as gasoline dispensers, leaves much to be desired. The slip-release joint suggested in the art becomes worn and separates without intention. A lever operated valve at the locus of the joint jams under stress, or becomes twisted and does not seat firmly. Remote valves, although operating as desired, spill large volumes of gasoline from the open hose sections. It is the primary object of this invention to provide a novel coupling of the valve-enclosed type which is completely contained at the point of rupture. It is another object of this invention to provide a break-away coupling which is completely contained within itself having no external levers for control of the valve member. Still another object of this invention is to provide such a coupling which will part at a preselected section of the device. A further object is to provide a coupling which will be operably closed by the included valve element where the rupture separation is minimal in extent providing greater safety in this type of mechanism. And yet another object of this invention is to provide a replaceable item usable with standard coupling fittings which includes the complete break-away coupling combination immediately replaceable for continued operation.

Other objects and advantages of the present invention will become apparent during the course of the following description.

In the drawings, one embodiment of the invention is shown. In this showing:

Figure 1:
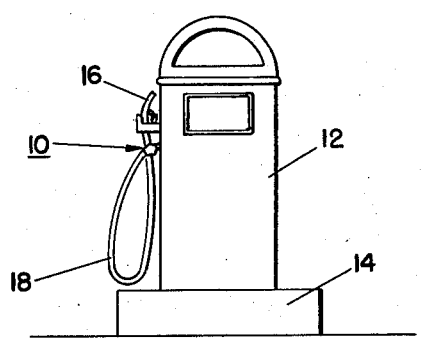
Figure 1 is an elevational view of a typical example showing application of the device.

As indicated in Figure 1, a particularly good use to which the device 10 of this application can be put is as a connector between a gasoline dispensing pump housing 12, mounted as shown on a typical pedestal or island 14, and the distributing nozzle 16 attached to hose 18. It will be immediately evident to those versed in the art of transmitting liquids that other uses than this can be made of the device, and that it may be readily placed in other positions on the hose or conduit. In the instance of use as shown, connection at the pump housing 12 is more advantageous as will be evident later.

Figure 2:
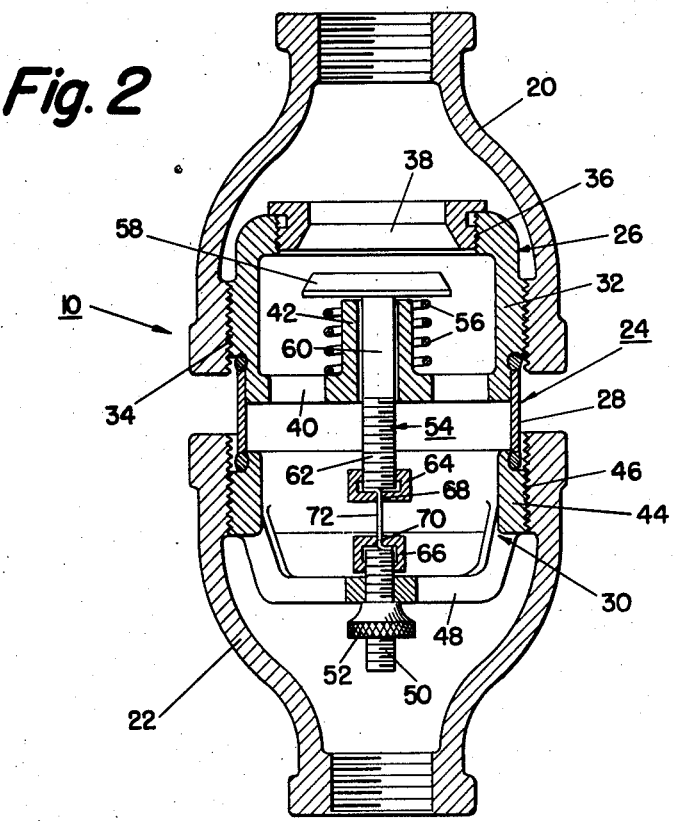
Figure 2 is a sectional view of a preferred embodiment of the device connected with standard pipe fittings for operation.
Figure 3:
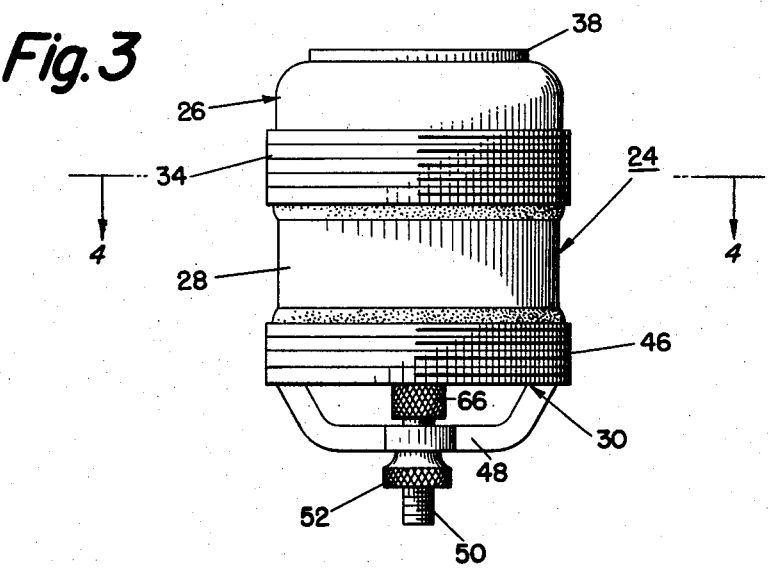
Figure 3 is an elevational view of the device as an insert separated from the supporting fittings.

Referring now to Figures 2, 3, 4 and 5, the break-away coupling sub-combination 10 considered as a removable insert mounted between standard pipe coupling fittings 20 and 22 will be described. In Figure 2, a pair of opposed reducing fittings 20 and 22 are shown threadedly engaging the coupling insert 24 further illustrated in the later figures. That these coupling fittings 20 and 22 need not necessarily be of a reducing type but may be of a diameter throughout equal to the insert measurement seems self-evident. Separate from the mounting means the insert, complete in itself for ready insertion and replacement, after operation, looks as shown in Figure 3.

Within the outer cover of the insert 24 the device is divided into three parts, an upper or up-stream portion 26, an intermediate frangible portion formed as a sleeve 28, and a lower or downstream portion 30. Each portion is held together by brazing the frangible sleeve 28 forming the intermediate section to the upper and lower portions 26 and 30 respectively, uniting them to form the complete insert 24.

Figure 4:
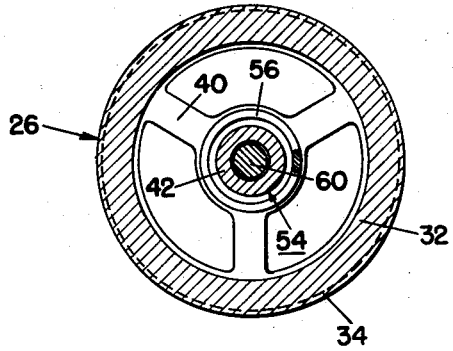
Figure 4 is a sectional view of Figure 3 taken on line 4—4.

Figures 2 and 4 show the upstream portion 26 to include a body member 32, externally threaded at 34 to engage standard pipe coupling 20, and internally threaded at 36 to position the valve seat 38. A spider portion 40 extends diametrically across the body adjacent the frangible sleeve 28 positioning the valve stem guide 42 concentrically of the insert.

Figure 5:
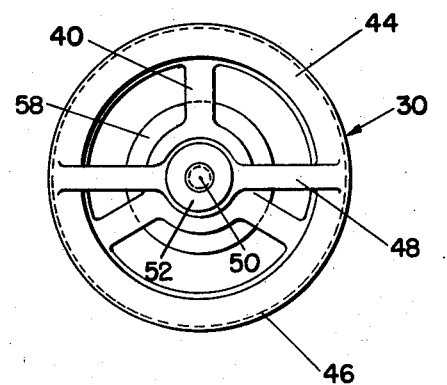
Figure 5 is a bottom plan view of Figure 3.

Figures 2 and 5 show the lower or downstream portion 30 of the insert to include a body member 44, externally threaded at 46 to engage standard pipe coupling 22. A spider 48, keeping the central portion as open as possible for the flow of fluids as does the spider 40 above in the upper body member, supports a concentrically positioned tensioning bolt 50 and adjusting nut 52.

Passing centrally of the insert 24, between the three portions 26, 28 and 30 above described, valve means 54, including a resilient member shown as a spring 56 supported in compression by upper spider 40 and valve head 58, is operably positioned to sealably engage the valve seat 38. Valve stem 60, forming a part of the valve means 54, slidably extends downwardly from engagement with valve head 58 through stem guide 42 and through the space made between the upper and lower portions by frangible sleeve 28 to terminate in a lower threaded portion 62, aligned with and spaced above tensioning bolt 50. Two nuts 64 and 66, threaded to engage the threaded portion 62 of the valve stem 60 and the tensioning bolt 50 respectively, are closed across the free or unengaged end to form apertures 68 and 70. Extending between nuts 64 and 66 positioned by the apertures 68 and 70 and tensioned to the proper degree by the adjusting nut 52 is a snap wire 72 bent at top and bottom to engage the space between the nut 64 and stem 62 above and nut 66 and stem 50 below. This wire is made from low tensile strength material which has very low ductility assuring proper operation as explained later.

To those who understand this art and the purposes of this device as described above in the outline of the problem leading to the recitation of the objects of the invention, the operation will be clear. However, to emphasize the novelty and improvement in the art afforded by the device disclosed here, the operation in form of an example will be described.

The embodiment selected for illustration, together with the use shown in Figure 1, will be described, although it will be understood that these illustrations should not be considered as limiting the use and scope of the device as explained above. When inserted between the pump housing 12 of a typical gasoline dispenser and the hose 18, a safety element is introduced to control fire and explosion hazards possible at any gasoline service station. An automobile driven away from such a dispensing means with the nozzle 16 still inserted in the gasoline tank opening of the automobile will, when there is no device such as described here, upset the pump housing and release gasoline. The electrical connections common to such contrivances ignite sparks to flame the spilled liquid causing serious damage.

Where the device 10 is used as shown, tension on hose 18 fractures the frangible sleeve 28. Upper and lower body members 26 and 30 separate, tensioning the non-ductile, low tensile strength wire 72, which readily snaps. Valve means 54 operates spring 56, urging valve head 58 upstream to close against valve seat 38. The source of gasoline is closed at a point nearest the bulk supply, and the pump housing remains standing without break in either the gasoline supply lines or electrical wiring. As valve 54 is held open solely by snap wire 72 which is concentrically positioned in the insert, the least rupture anywhere in frangible sleeve 28 will misalign the concentric structure and release the valve to the closing position.

After shutting off the electrical power and gasoline supply to the incapacitated pump, the ruptured valve-sealed break-away coupling insert is unscrewed from between the standard coupling members 20 and 22 and a new, operable insert placed between them. The operated insert is then returned for repair or discarded as unusable, as desired.

From the above description and discussion of operation, it will be evident that a replaceable insert is supplied as a safety device for conduits strained to the breaking point. Further, the least breaking strain is sufficient to throw the valve retaining means out of line and release the valve element to closure. Complete rupture, or lever operation, is not required. And finally, a new insert, ready for immediate operation, can replace the damaged device with a minimum of effort placing the conduit in operation promptly.

The invention claimed is:

1. As an article of manufacture a replaceable safety coupling insert usable in conjunction with standard pipe couplings comprising a valve, including an upper disc and supporting stem, upper and lower valve support means externally threaded to cooperate with spaced apart pipe couplings, a valve seat in the upper valve support means adapted to receive the valve disc in sealing engagement, a snap wire stretched between the lower support means and the valve stem holding the valve in an open position, a spring encircling the valve stem urging the valve into the closed position thereby tensing the snap wire which opposes this valve movement, and a frangible sleeve mounted between the upper and lower support means and holding the upper and lower support means in spaced alignment.

2. A replaceable safety coupling insert usable in conjunction with standard pipe couplings comprising an upper body member securable to one coupling, valve means operably positioned in said upper body member and adapted to sealably engage a valve seat therein; a lower body member securable to a second pipe coupling and having a tension adjusting means in operating alignment with the valve means in the upper body member; resilient means in the upper body member urging the valve means into sealing engagement with the valve seat, a tensioned restraining member of frangible material connected to the resiliently urged valve means of the upper body and the tension adjusting means in the lower body, and a frangible sleeve maintaining said upper and lower bodies in operable spaced-apart alignment with the valve and its associated operating elements.

3. A safety insert for use in a fluid transmitting hose adapted to be mounted between standard coupling fittings comprising an upper body member securable to one coupling fitting, a lower body member securable to the other coupling fitting and a frangible connection between said body members; said upper body member including a valve seat, a valve, a guide operably positioning said valve in the upper body member, a spring cooperating with the valve and tending to seat the same, a valve stem extending through the guide positioning the valve for engagement with the seat; said lower body member including a spider, a tensioning bolt operatively carried by said spider, and means to adjustably position the tensioning bolt relative to the spider; a frangible element extending between the valve stem in the upper body member and the tensioning bolt in the lower body member and means cooperating with the valve stem and tensioning bolt connecting the engaging ends of the frangible element holding the valve from the seat in the upper body until released by rupture of both the frangible connection between the bodies and said frangible element.

References Cited in the file of this patent
UNITED STATES PATENTS

| | | |
|---|---|---|
| 2,048,387 | Johnsen | July 21, 1936 |
| 2,048,388 | Johnsen | July 21, 1936 |
| 2,798,503 | Carver et al. | July 9, 1957 |